United States Patent Office 3,547,693
Patented Dec. 15, 1970

3,547,693

MAGNETIC TAPE

Albert P. Huguenard, Vincennes, France, assignor to Eastman Kodak Company, Rochester, N.Y., a corporation of New Jersey No Drawing. Filed Sept. 20, 1968, Ser. No. 762,672
Claims priority, application France, Jan. 12, 1968, 135,839
Int. Cl. H01f *10/02*
U.S. Cl. 117—235 8 Claims

ABSTRACT OF THE DISCLOSURE

Magnetic tape incorporating monomeric vinyl stearate, allyl stearate, or other monomeric aliphatic esters of a long chained fatty acid and of an unsaturated alcohol, as a lubricant.

BACKGROUND OF THE INVENTION

Field of the invention

This invention relates to a tape for magnetic recording showing a high wear strength, more particularly to the use of a compound class as lubricating agents for the said tapes. The invention also relates to a process for incorporating said lubricating agents.

Description of the prior art

Magnetic tapes are generally made up of a non magnetizable base which is coated with a layer of magnetizable particles dispersed in a binder most often constituted of synthetic resins.

For high density storage of magnetic signals, the heads must be in close contact with the magnetizable coating. This causes phenomena connected with abrasion which may result in a more or less rapid alteration of the coating. A frequently observed phenomenon consists in a tearing of material which accumulates on the head or heads or is transferred to the surface of the tape, thus causing a fading or even a vanishing of the recorded signal.

These phenomena are particularly noticeable in the case of tapes used as a memory in information processing systems and of those intended for image recording, this in view of the high relative speeds between the heads and the magnetizable coating and of the particular requirements connected with such types of utilization. For example, for video recording in which the track is helically scanned, which permits still frame operation, the tape area involved is submitted to several thousands of scannings per minute, which, in the case of an ordinary tape, results in a rapid deterioration of the coating and disappearance of the image.

To remedy these drawbacks, various lubricating agents have been used so far, such as molybdenum disulfide, wax, fatty acid amides as well as fatty acid esters prepared from a monobasic fatty acid having at least 18 carbon atoms and from a lower or medium monoalcohol, particularly butyl stearate, as disclosed in the Japanese patent application No. 68,387/64, filed on Dec. 5, 1964, in the name of Sony Corporation and published with No. 18,064/66. But on the one hand, some of these lubricating agents, such as molybdenum disulfide, do not allow to obtain the wear strengths required for certain utilizations, particularly in video recording, and, on the other hand, some others as the above-mentioned esters, show a tendency to sweat.

SUMMARY OF THE INVENTION

According to the present invention, magnetic tapes are obtained showing an improved wear strength by incorporating in a magnetic layer comprising a binder and a magnetic material, such as a magnetic oxide, a monomeric aliphatic ester of an unsaturated, branched or not, alcohol, and of a long-chained fatty acid such as one having 12 to 20 carbon atoms. In the coating, this ester exists as an independent unreacted ingredient and acts as a lubricating agent which allows to markedly extend the tape life.

The use of the magnetic coating according to the invention is particularly advantageous in tapes used as a memory in information processing systems and those intended for video recording, but it can be extended to the field of sound recording when the coating is submitted to very hard conditions of use, whether owing to repeated scanning as in laboratories for the study of languages, or owing to high tensions and to the particular shapes of the head as in the case of 35 mm. or 16 mm. perforated films.

The esters of fatty acids for carrying out the invention should be monomeric, and preferably include those of stearic acid, such as allyl stearate, vinyl stearate, etc. The most interesting results are obtained with vinyl stearate. Lubricating agents ratios in the range of from about 2/100 to about 30/100 by weight of the binder are suitable for carrying out the present invention, but the optimum ratio is about 10/100.

According to the invention, the lubricating agent, particularly monomeric vinyl stearate, is incorporated to the magnetic coating at any stage of the coating preparation by any incorporation, imbibition, impregnation, spraying process, etc. It may be added to the binder dope, during the dispersion of the magnetic particles in the binder, or to the finished coating, by spraying, for example. We have noted according to the invention, that the tapes can also be soaked with a lubricating agent solution in a solvent which is not a solvent of the coating, which allows to lubricate a magnetic tape already manufactured. Ethyl alcohol is suitable as a solvent with many binders.

The binders concerned by the present invention are, in particular, vinyl chloride and vinyl acetate copolymers, vinylidene chloride and acrylonitrile copolymers, acrylic and/or methacrylic ester copolymers, polyvinyl butyral, butadiene and acrylonitrile copolymers, butadiene and styrene copolymers, as well as crosslinked or not crosslinked polycondensates such as polyamides, polyurethanes, polyesters, or mixtures of these binders, etc. Good results are especially obtained when a mixture of a partially hydrolyzed vinyl acetochloride copolymer and of a butadiene/acrylonitrile copolymer is used as a binder, this mixture containing from 10/100 to 30/100 of the second copolymer, the total proportion of binder to the mixture of binder and magnetic oxide being 30/100. Oleic acid and other dispersing agents can also be incorporated to make the dispersion easier.

The magnetic tape of the invention can also contain addenda which impart other properties, such as conductive pigments as carbon to avoid statism, without modifying the desired characteristics.

The preferred magnetic material is acicular gamma iron oxide $Fe_2O_3$, in particles of $0.3\mu$ to $0.8\mu$.

The magnetic coating of the invention can be applied onto flexible films such as polyester, cellulose triacetate or polyvinyl chloride bases. It can, however, be also used to coat any other surface.

The binder ratio to iron oxide is preferably comprised of between 20 g. and 40 g. for 100 g. of oxide. For polyvinyl acetochloride which is a usual binder, this ratio is preferably comprised of between 22.5 g. and 35 g.

In the above-mentioned Japanese patent application, the lubricating agent used is a monobasic aliphatic acid, e.g. stearic acid, and a lower and medium monohydric alcohol, such as butyl stearate. After various tests, it is noted that butyl stearate is sweating much more easily than vinyl stearate, which is a drawback for the storage of tapes containing it. Moreover, the incorporation of vinyl stearate to layers which usually assume the shape of an eaves trough leads to a perfectly flat film. This result is not observed with tapes containing butyl stearate.

It is also noted that the surface condition of layers containing an unsaturated ester, such as vinyl stearate, is very much improved and that the abrasive action of the tapes on the heads is reduced.

THE PREFERRED EMBODIMENTS

The following examples illustrate the invention without limiting its scope.

Example 1

In a porcelain jar containing 8 mm. steel balls are placed 150 g. of acicular gamma magnetic iron oxide $Fe_2O_3$ with 140 ml. of methylisobutylketone and 5 g. of oleic acid. After dispersing for 24 hours, there is added to this slurry a dope obtained by dissolving in methylisobutylketone a copolymer containing 77% vinylidene chloride, 20% acrylonitrile, 3% maleic anhydride. After homogenizing for 24 hours, 4.5 g. of monomeric vinyl stearate are added.

The dispersion is filtered and coated on a poly(ethylene terephthalate) base having a thickness of 25 microns. After evaporation of the solvent, the 8 to 10 micron thick coating is calendered between chromium-plated rollers. A 25.4 mm. wide tape is slit. The tape so prepared is placed on a helical-scanning magnetoscope. After recording, a "still frame" reading is made as explained above. It is carried on for more than an hour without any alteration of the image. With the control tape without any vinyl stearate, the image is altered and disappears after a few minutes.

Example 2

In a jar similar to that of Example 1 are placed 150 g. of acicular gamma iron oxide $Fe_2O_3$ and a dope containing 160 ml. of methylisobutylketone, 10 g. of a vinylidene chloride-acrylonitrile copolymer sold by Société Solvay under the name Ixan WN 82 B and 5 g. of monomeric vinyl stearate. After dispersing for 72 hours, there is added to the resulting slurry a dope prepared by dissolving 35 g. of Ixan WN 82 B in 180 ml. of methylisobutylketone. The mixture is homogenized.

The tape prepared and tested as described in the previous example has a life of more than 1 hour.

Example 3

150 g. of iron oxide are dispersed for 24 hours in the presence of 140 ml. of methylisobutylketone and 5 g. of oleic acid. There is then added a dope comprised of 37.5 g. of partly saponified copolymer of vinyl chloride and vinyl acetate sold by Société Rhône-Poulenc under the name Rhodopas AXRH, 5 g. of monomeric vinyl stearate in 100 ml. of methylisobutylketone and 50 ml. of toluene. The mixture is homogenized.

The resulting tape tested in accordance with the described techniques has a life of more than one hour.

With the control tape without any vinyl stearate, the image is altered and disappears in a few minutes.

Example 4

In a porcelain jar containing 8 mm. steel balls are placed 150 g. of acicular gamma magnetic iron oxide $Fe_2O_3$ with the dope obtained by dissolving 10 g. of a copolymer containing 76/100 of vinylidene chloride, 20/100 of acrylonitrile and 4/100 of acrylamide diaketone in 170 ml. of methylisobutylketone. After dispersing for 72 hours, there is added to the resulting slurry the residue of the dope containing 35 g. of th above-mentioned polymer and 4.5 g. of monomeric vinyl stearate. The mixture is homogenized. The tape prepared and tested as described in Example 1 has a life of more than 1 hour.

Example 5

150 g. of iron oxide are dispersed for 24 hours in the presence of 140 ml. of methylisobutylketone and 5 g. of oleic acid. There is added to the slurry a dope comprised of "Rhodopas AX" resin, a copolymer of vinyl acetochloride (85/15) sold by Société Rhône-Poulenc, and of 10 g. of monomeric allyl stearate. After homogenizing, coating and calendering, the resulting tape is tested by the described technique and has a life of more than one hour.

The invention has been described in detail with particular reference to certain preferred embodiments thereof, but it will be understood that variations and modifications can be effected within the spirit and scope of the invention as described hereinabove, and as defined in the appended claims.

I claim:

1. In a magnetic recording tape comprising a base and a magnetic coating thereon containing magnetizable particles dispersed in a binder, the improvement comprising a monomeric fatty acid ester of a branched or unbranched unsaturated alcohol associated with said coating as a lubricating agent said ester being selected from the group consisting of vinyl and allyl esters of a fatty acid having 12 to 20 carbon atoms.

2. In a magnetic tape in accordance with claim 1, said ester being allyl stearate.

3. In a magnetic tape in accordance with claim 1, said ester being vinyl stearate.

4. In a magnetic tape in accordance with claim 1, said ester being selected from the group consisting of vinyl and allyl stearates.

5. In a magnetic recording tape in accordance with claim 1, said ester being present in an amount between about 2 and 30% by weight of said binder.

6. In a magnetic recording tape in accordance with claim 5, said amount being about 10%.

7. In a magnetic recording tape in accordance with claim 5, the amount of said binder being from about 20 to about 40 grams per 100 grams of said magnetizable particles.

8. In a magnetic recording tape in accordance with claim 1, said binder being a mixture of partially hydrolized vinyl acethochloride copolymer and a butadiene-acrylonitrile copolymer.

References Cited

UNITED STATES PATENTS

| | | | |
|---|---|---|---|
| 2,383,601 | 8/1945 | Keim | 260—410 |
| 2,971,916 | 2/1961 | Schleicher et al. | 117—235X |
| 3,029,157 | 4/1962 | Sutheim et al. | 117—235UX |
| 3,274,111 | 9/1966 | Sada et al. | 117—235X |
| 3,284,360 | 11/1966 | Peshin | 117—235X |

FOREIGN PATENTS

| | | | |
|---|---|---|---|
| 527,016 | 6/1956 | Canada | 260—410 |
| 662,650 | 12/1951 | Great Britain | 260—410 |
| 998,648 | 7/1965 | Great Britain | 260—410 |

WILLIAM D. MARTIN, Primary Examiner

B. D. PIANALTO, Assistant Examiner

U.S. Cl. X.R.

252—62.54; 260—410, 413